United States Patent
Shao et al.

(10) Patent No.: US 12,142,125 B2
(45) Date of Patent: Nov. 12, 2024

(54) METHODS AND SYSTEMS FOR FIRE MONITORING AND EARLY WARNING IN A SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Lei Zhang, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 227 days.

(21) Appl. No.: 17/816,434

(22) Filed: Aug. 1, 2022

(65) Prior Publication Data
US 2023/0419805 A1 Dec. 28, 2023

(30) Foreign Application Priority Data
Jun. 28, 2022 (CN) .......................... 202210740477.8

(51) Int. Cl.
*G08B 19/00* (2006.01)
*G06V 10/764* (2022.01)
(Continued)

(52) U.S. Cl.
CPC ........... *G08B 19/00* (2013.01); *G06V 10/764* (2022.01); *G06V 10/803* (2022.01);
(Continued)

(58) Field of Classification Search
CPC ...... G08B 19/00; G08B 31/00; G08B 29/186; G08B 17/125; G06V 10/764;
(Continued)

(56) References Cited

U.S. PATENT DOCUMENTS 9,977,415 B2 * 5/2018 Zimmerman ....... H04L 12/2807
10,447,786 B1 * 10/2019 Arnberg ................ H04W 12/35
(Continued)

FOREIGN PATENT DOCUMENTS

| CN | 101593399 A | 12/2009 |
| CN | 106097642 B | 9/2018 |

(Continued)

OTHER PUBLICATIONS

White Paper on Urban Brain Development, Smart City Standard Working Group of National Beacon Commission, 2022, 59 pages.
(Continued)

*Primary Examiner* — Curtis J King
(74) *Attorney, Agent, or Firm* — METIS IP LLC

(57) ABSTRACT

This present disclosure provides a method and system for fire monitoring and early warning in a smart city based on Internet of Things. The method being executed by the management platform, and the method comprising: obtaining monitoring data collected by the object platforms through the sensor network platform, the monitoring data including smoke data, temperature data, image data of a drone, and manual inspection data, the manual inspection data being obtained based on a manual inspection interval; determining a fire risk level based on the monitoring data; in response to the fire risk level meeting a preset condition, sending an alarm to the user platform through the service platform; and in response to the fire risk level not meeting the preset condition, determining the manual inspection interval based on the fire risk level, and sending the manual inspection interval to the service platform and/or the user platform.

13 Claims, 5 Drawing Sheets

(51) Int. Cl.
*G06V 10/80* (2022.01)
*G06V 10/82* (2022.01)
*G06V 20/17* (2022.01)
*G06V 20/54* (2022.01)

(52) U.S. Cl.
CPC ............ *G06V 10/806* (2022.01); *G06V 10/82* (2022.01); *G06V 20/17* (2022.01); *G06V 20/54* (2022.01)

(58) Field of Classification Search
CPC .... G06V 10/803; G06V 10/806; G06V 10/82; G06V 20/17; G06V 20/54; Y02A 10/40; G06Q 10/063114; G06Q 10/0635; G06Q 50/265; G06F 16/252; G16Y 20/00; G16Y 20/10; G16Y 40/10; G16Y 40/35; G16Y 40/40; G16Y 40/50
See application file for complete search history.

(56) References Cited

U.S. PATENT DOCUMENTS

| | | | | |
|---|---|---|---|---|
| 10,908,568 | B2* | 2/2021 | Jeong | H04L 12/2818 |
| 11,295,131 | B1* | 4/2022 | Dhawan | G08G 5/0043 |
| 11,363,104 | B2* | 6/2022 | Sethi | H04L 67/12 |
| 11,805,023 | B2* | 10/2023 | Kim | G16Y 40/35 |
| 11,888,716 | B1* | 1/2024 | Lloyd | G16Y 40/10 |
| 11,937,160 | B2* | 3/2024 | Clawson | A61B 5/01 |
| 2014/0266675 | A1* | 9/2014 | Piccolo, III | G08B 29/126 |
| | | | | 340/514 |
| 2015/0367157 | A1* | 12/2015 | Rohlik | A62C 35/11 |
| | | | | 701/29.2 |
| 2017/0026858 | A1* | 1/2017 | Mckee | H04W 4/70 |
| 2017/0171180 | A1* | 6/2017 | Britt | G06F 16/9554 |
| 2017/0171196 | A1* | 6/2017 | Britt | H04L 63/0876 |
| 2017/0225336 | A1* | 8/2017 | Deyle | B25J 11/008 |
| 2017/0345420 | A1* | 11/2017 | Barnett, Jr. | G10L 15/1815 |
| 2018/0012482 | A1* | 1/2018 | Brown | G05B 15/02 |
| 2018/0116004 | A1* | 4/2018 | Britt | H04W 28/0263 |
| 2018/0167435 | A1* | 6/2018 | Kinarti | H04L 65/762 |
| 2018/0191814 | A1* | 7/2018 | Kinarti | H04L 43/0876 |
| 2019/0113899 | A1* | 4/2019 | Jeong | H04L 67/125 |
| 2019/0146444 | A1* | 5/2019 | Brown | G08B 25/14 |
| | | | | 340/514 |
| 2019/0230029 | A1* | 7/2019 | Eswara | H04L 45/48 |
| 2019/0248013 | A1* | 8/2019 | Deyle | B25J 13/006 |
| 2019/0250899 | A1* | 8/2019 | Riedl | H04L 9/0825 |
| 2020/0053325 | A1* | 2/2020 | Deyle | H04N 7/185 |
| 2020/0125048 | A1* | 4/2020 | McKee | H04L 63/20 |
| 2020/0138223 | A1* | 5/2020 | Silverman | H04W 12/47 |
| 2020/0193155 | A1* | 6/2020 | Keohane | G06N 5/046 |
| 2020/0238114 | A1* | 7/2020 | Wang | G08B 17/125 |
| 2020/0259667 | A1* | 8/2020 | Garnier | H04L 67/12 |
| 2020/0280491 | A1* | 9/2020 | Riedl | H04L 41/22 |
| 2020/0285206 | A1* | 9/2020 | Young | G08B 19/00 |
| 2020/0322434 | A1* | 10/2020 | Corrion | G01S 19/01 |
| 2020/0327997 | A1* | 10/2020 | Behrens | G08B 25/10 |
| 2020/0341543 | A1* | 10/2020 | Thoresen | G06F 3/011 |
| 2020/0344040 | A1* | 10/2020 | Abdolee | H04L 9/0668 |
| 2020/0346751 | A1* | 11/2020 | Horelik | G05D 1/101 |
| 2020/0380853 | A1* | 12/2020 | Sun | G08B 25/10 |
| 2021/0046650 | A1* | 2/2021 | Deyle | G05D 1/0214 |
| 2021/0126976 | A1* | 4/2021 | Chang | G16Y 20/20 |
| 2021/0150692 | A1* | 5/2021 | Dickman | G06F 18/2148 |
| 2021/0188541 | A1* | 6/2021 | Kurani | B65F 1/14 |
| 2021/0216770 | A1* | 7/2021 | Kang | G01C 21/20 |
| 2021/0295665 | A1* | 9/2021 | Bacinschi | G16Y 40/50 |
| 2021/0295674 | A1* | 9/2021 | Choudhary | H04L 63/00 |
| 2021/0297833 | A1* | 9/2021 | Bacinschi | G16Y 10/80 |
| 2021/0328880 | A1* | 10/2021 | Kim | G16Y 40/35 |
| 2021/0385304 | A1* | 12/2021 | Li | G05B 19/042 |
| 2022/0143438 | A1* | 5/2022 | Stanley | A62C 3/0214 |
| 2022/0164675 | A1* | 5/2022 | Sehmer | G06Q 50/265 |
| 2022/0272792 | A1* | 8/2022 | Werner | H04W 84/18 |
| 2022/0335799 | A1* | 10/2022 | P | G08B 5/226 |
| 2022/0345868 | A1* | 10/2022 | Clawson | G16H 40/63 |
| 2022/0398840 | A1* | 12/2022 | Dhawan | G06V 20/52 |
| 2023/0104684 | A1* | 4/2023 | Wilkosz | H04L 67/52 |
| | | | | 707/705 |
| 2023/0222801 | A1* | 7/2023 | Rao | G08B 29/00 |
| | | | | 340/506 |
| 2023/0254676 | A1* | 8/2023 | Ståhl | H04W 8/245 |
| | | | | 455/419 |
| 2023/0259798 | A1* | 8/2023 | Modugula | G06Q 10/0635 |
| | | | | 706/10 |
| 2023/0359194 | A1* | 11/2023 | Dickson | G05B 23/0283 |
| 2023/0377186 | A1* | 11/2023 | Britt | G06V 10/774 |
| 2023/0379683 | A1* | 11/2023 | Roberts | H04W 76/14 |
| 2024/0032150 | A1* | 1/2024 | Bush | G06V 20/13 |
| 2024/0037669 | A1* | 2/2024 | Hakimi-Boushehri | G06Q 30/0278 |
| 2024/0080363 | A1* | 3/2024 | Wang | H04L 67/12 |

FOREIGN PATENT DOCUMENTS

| | | |
|---|---|---|
| CN | 112002095 A | 11/2020 |
| CN | 112464813 A | 3/2021 |
| CN | 113362553 A | 9/2021 |
| CN | 113971861 A | 1/2022 |

OTHER PUBLICATIONS

Zhang, Mingyue et al., Thinking of Building Forest Fire Early Warning Systems Based on Internet of Things and Artificial Intelligence Technologies, Journal of Green Science and Technology, 166-168, 2020.

* cited by examiner

METHODS AND SYSTEMS FOR FIRE MONITORING AND EARLY WARNING IN A SMART CITY BASED ON INTERNET OF THINGS

CROSS-REFERENCE TO RELATED APPLICATIONS

This application claims priority to Chinese Patent Application No. CN202210740477.8, filed on Jun. 28, 2022, the entire contents of which are hereby incorporated by reference.

TECHNICAL FIELD

This present disclosure relates to the field of the Internet of Things, and in particular to a method and system for fire monitoring and early warning in a smart city based on the Internet of Things.

BACKGROUND

In recent years, fires have occurred frequently due to incomplete fire safety measures, which will bring great financial and material losses to the society and individuals. Nowadays, fire management departments focus on public places with potential safety hazards, promote fire safety knowledge, and people's awareness of fire safety is also increasing.

With the birth of the Internet of Things technology, the use of Internet resources can realize the connection between people and things, and the connection between things and things, so as to achieve the purpose of informatization, remote management control and intelligence. The Internet of Things is gradually being applied to various fields, including various disaster warnings.

Thus, it is desirable to provide a method and system for fire monitoring and early warning in a smart city based on the Internet of Things, which can detect the probability of fire occurrence and carry out traffic regulation for rescue after the fire occurs.

SUMMARY

This present disclosure provides a method of fire monitoring and early warning in a smart city based on Internet of Things, and the method comprises: obtaining monitoring data collected by the object platforms through the sensor network platform, the monitoring data including smoke data, temperature data, image data of a drone, and manual inspection data, the manual inspection data being obtained based on a manual inspection interval; the sensor network platform adopting different sensor network sub-platforms for performing data storage, data processing and/or data transmission on the monitoring data obtained by the different object platforms; the different sensor network sub-platforms corresponding to different regional locations; the management platform adopting different management sub-platforms for performing data storage, data processing and/or data transmission on the monitoring data obtained by the different sensor network sub-platforms; determining a fire risk level based on the monitoring data; in response to the fire risk level meeting a preset condition, sending an alarm to the user platform through the service platform; and in response to the fire risk level not meeting the preset condition, determining the manual inspection interval based on the fire risk level, and sending the manual inspection interval to the service platform and/or the user platform.

This present disclosure provides a system for fire monitoring and early warning in a smart city based on Internet of Things, the system includes a user platform, a service platform, a management platform, a sensor network platform, and object platforms, and the management platform is configured to perform following operations including: and the method comprising: obtaining monitoring data collected by the object platforms through the sensor network platform, the monitoring data including smoke data, temperature data, image data of a drone, and manual inspection data, the manual inspection data being obtained based on a manual inspection interval; the sensor network platform adopting different sensor network sub-platforms for performing data storage, data processing and/or data transmission on the monitoring data obtained by the different object platforms; the different sensor network sub-platforms corresponding to different regional locations; the management platform adopting different management sub-platforms for performing data storage, data processing and/or data transmission on the monitoring data obtained by the different sensor network sub-platforms; determining a fire risk level based on the monitoring data; in response to the fire risk level meeting a preset condition, sending an alarm to the user platform through the service platform; and in response to the fire risk level not meeting the preset condition, determining the manual inspection interval based on the fire risk level, and sending the manual inspection interval to the service platform and/or the user platform.

This present disclosure provides a device for fire monitoring and early warning in a smart city based on Internet of Things, wherein the device includes at least one processor and at least one memory; the at least one memory is used to store computer instructions; the at least one processor is configured to execute at least part of the instructions in the computer to implement the method for fire monitoring and early warning in a smart city based on Internet of Things described in any embodiment of this present disclosure.

This present disclosure provides a non-transitory computer-readable storage medium, wherein the storage medium stores computer instructions, after the computer reads the computer instructions in the storage medium, the computer implement the method for fire monitoring and early warning in a smart city based on Internet of Things as described in any of the above embodiments.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same number denote the same structure, wherein.

DETAILED DESCRIPTION

Figure 1:
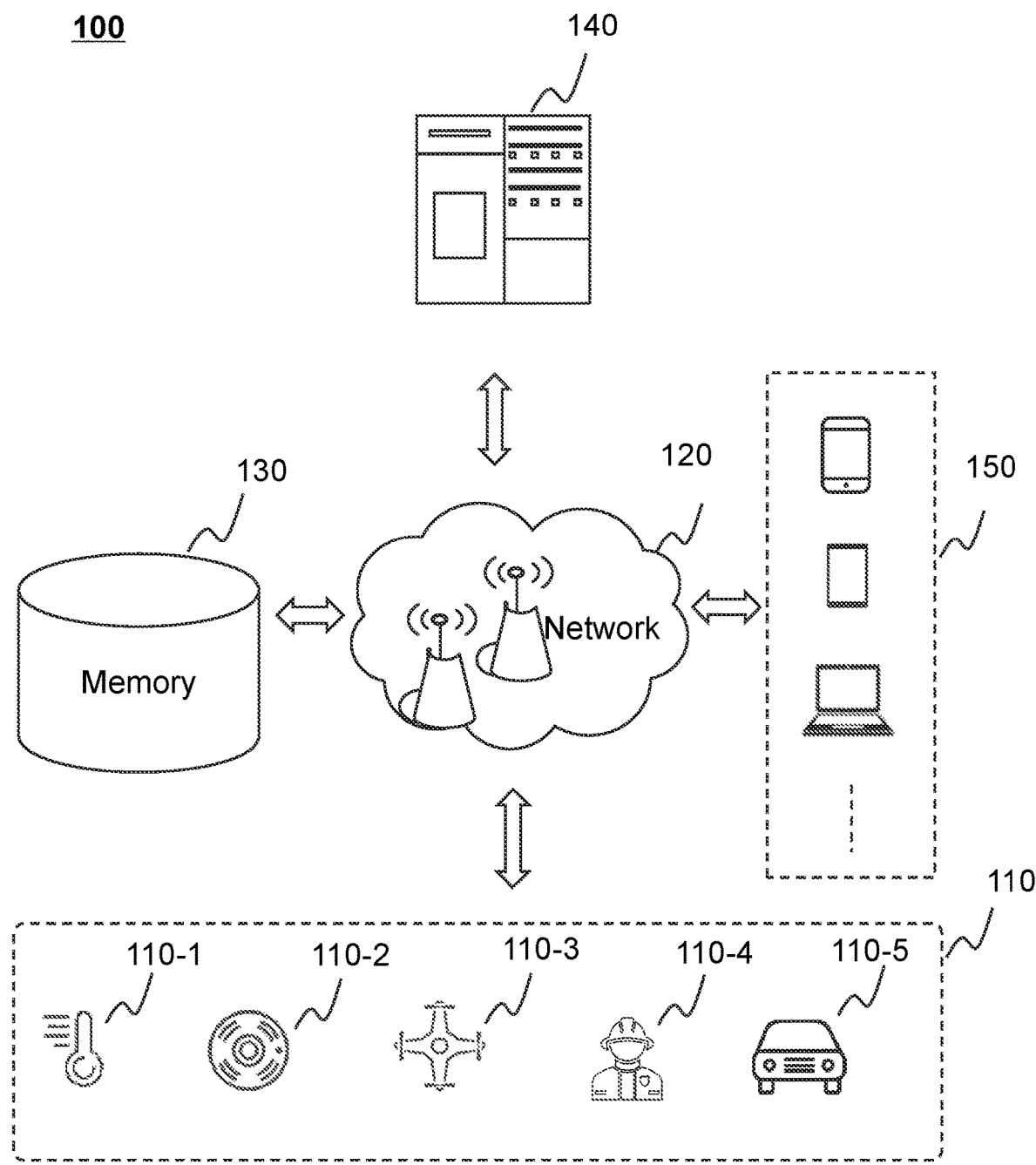
FIG. 1 is a schematic diagram illustrating an application scenario of a system for fire monitoring and early warning in a smart city based on Internet of Things according to some embodiments of this present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an application scenario of a system for fire monitoring and early warning in a smart city based on Internet of Things according to some embodiments of this present disclosure.

In some embodiments, the application scenario 100 of a system for fire monitoring and early warning in a smart city based on Internet of Things may include a collection device 110, a network 120, a memory 130, a processing device 140 and a terminal 150. In some embodiments, the components in the application scenario 100 may connect and/or communicate with each other via the network 120 (e.g., a wireless connection, a wired connection, or a combination thereof). For example, the processing device 140 may be connected to the memory 130 through the network 120.

The collection device 110 may be used to obtain relevant information of a target area. In some embodiments, the collection device 110 includes a smoke sensor 110-1, a temperature sensor 110-2, a drone 110-3, a fire detection device 110-4, a traffic monitoring device 110-5, or the like. In some embodiments, the relevant information of the target area may be information for early warning or traffic regulation of one or more areas where a fire may occur or is occurring. In some embodiments, the relevant information of the target area may include, but is not limited to, smoke data, temperature data, drone image data (also referred to as image data of a drone), manual inspection data, road condition data, or the like. The smoke data may be obtained by the smoke sensor 110-1, the temperature data may be obtained by the temperature sensor 110-2, the drone image data may be obtained by the drone 110-3, the manual inspection data may be obtained by the fire detection device 110-4 equipped by inspectors based on a manual inspection interval (also referred to as time interval of manual inspection), the road condition data may be obtained by the traffic monitoring device 110-5.

The network 120 may include any suitable network that is capable of promoting information and/or data exchange of the application scenario 100. In some embodiments, information and/or data may be exchanged between one or more components of the application scenario 100 (e.g., the processing device 140, the memory 130, and the terminal 150) over the network 120. The network 120 may include a local area network (LAN), a wide area network (WAN), a wired network, a wireless network, or the like, or any combination thereof. In some embodiments, the network 120 may be any one or more of a wired network or a wireless network. In some embodiments, the network 120 may include one or more network access points. For example, the network 120 may include wired or wireless network access points, such as base stations and/or network exchange points. Through these network access points, one or more components of the application scenario 100 may connect to the network 120 to exchange data and/or information.

The memory 130 may be used to store data, instructions, and/or any other information. In some embodiments, the memory 130 may be part of the processing device 140. In some embodiments, the memory 130 may be in communication with at least one component of the application scenario 100 (e.g., the processing device 140, the terminal 150). In some embodiments, the memory 130 may store data and/or instructions that the processing device 140 executes or uses to accomplish the exemplary methods described in this present disclosure. For example, the memory 130 may store preset conditions for judging the fire risk level. As another example, the memory 130 may store one or more machine learning models.

The processing device 140 may process information and/or data related to the application scenario 100 of the system for fire monitoring and early warning system to perform one or more functions described in this present disclosure. For example, the processing device 140 may determine the fire risk level of the target area based on smoke data, temperature data, drone image data, and manual inspection data of the target area. The processing device 140 may process data, information and/or processing results obtained from other devices or system components and execute program instructions based on the data, information and/or processing results to perform one or more functions described in this present disclosure.

The terminal 150 may refer to one or more terminals or software used by a user. In some embodiments, a user (e.g., fire warning manager, firefighter, traffic police, driver, etc.) may be the owner of the terminal 150. In some embodiments, the terminal 150 may include a mobile device, a tablet computer, a notebook computer, a wearable smart terminal, etc., or any combination thereof. In some embodiments, the terminal 150 may be a device with a positioning function. For example, the terminal 150 may be a positioning device for fire escape personnel.

It should be noted that the application scenario 100 is provided for illustrative purposes only, and is not intended to limit the scope of the present disclosure. Those ordinarily skilled in the art may make various modifications or changes based on the description of the present specification. For example, the application scenario 100 may also include information sources. However, such changes and modifications do not depart from the scope of the present application.

The Internet of Things system is an information processing system that includes a user platform, a service platform, a management platform, a sensor network platform, and some or all of the object platforms, wherein the user platform is the leader of the entire Internet of Things system, which may be used to obtain user needs. The demand of the user is a foundation and premise of the formation of the operating system of the Internet of Things. The connection between each platform of the Internet of Things is to meet the demand of the user. The service platform is a bridge between the user platform and the management platform to realize the connection of the user platform and the management platform. The service platform may provide a user with input and output services. The management platform may realize the overall planning and coordination of the connection and cooperation between various functional platforms (such as user platform, service platform, sensor network platform, and object platform). The management platform gathers the information of the Internet of Things system, and may provide perception management and control management functions for the Internet of Things system; the sensor network platform may realize the connection of the management platform and the object platform, and play the functions of sensing information sensor communication and control information sensor communication; the object platform is a functional platform for generating perception information and executing control information.

The processing of information in the Internet of Things system may be divided into the processing flow of perception information and the processing flow of control information, and the control information may be information generated based on the perception information. The processing of perception information is that the object platform obtains the perception information and transmits it to the management platform through the sensor network platform, the management platform transmits the calculated perception information to the service platform, and finally to the user platform, and the user generates control information after judging and analyzing the perception information. The control information is generated by the user platform and sent to the service platform, and the service platform then transmits the control information to the management platform, the management platform calculates and processes the control information, and sends it to the object platform through the sensor network platform, thereby realizing the control of the corresponding object.

In some embodiments, when the Internet of Things system is applied to city management, it may be called the Internet of Things system of a smart city.

Figure 2:
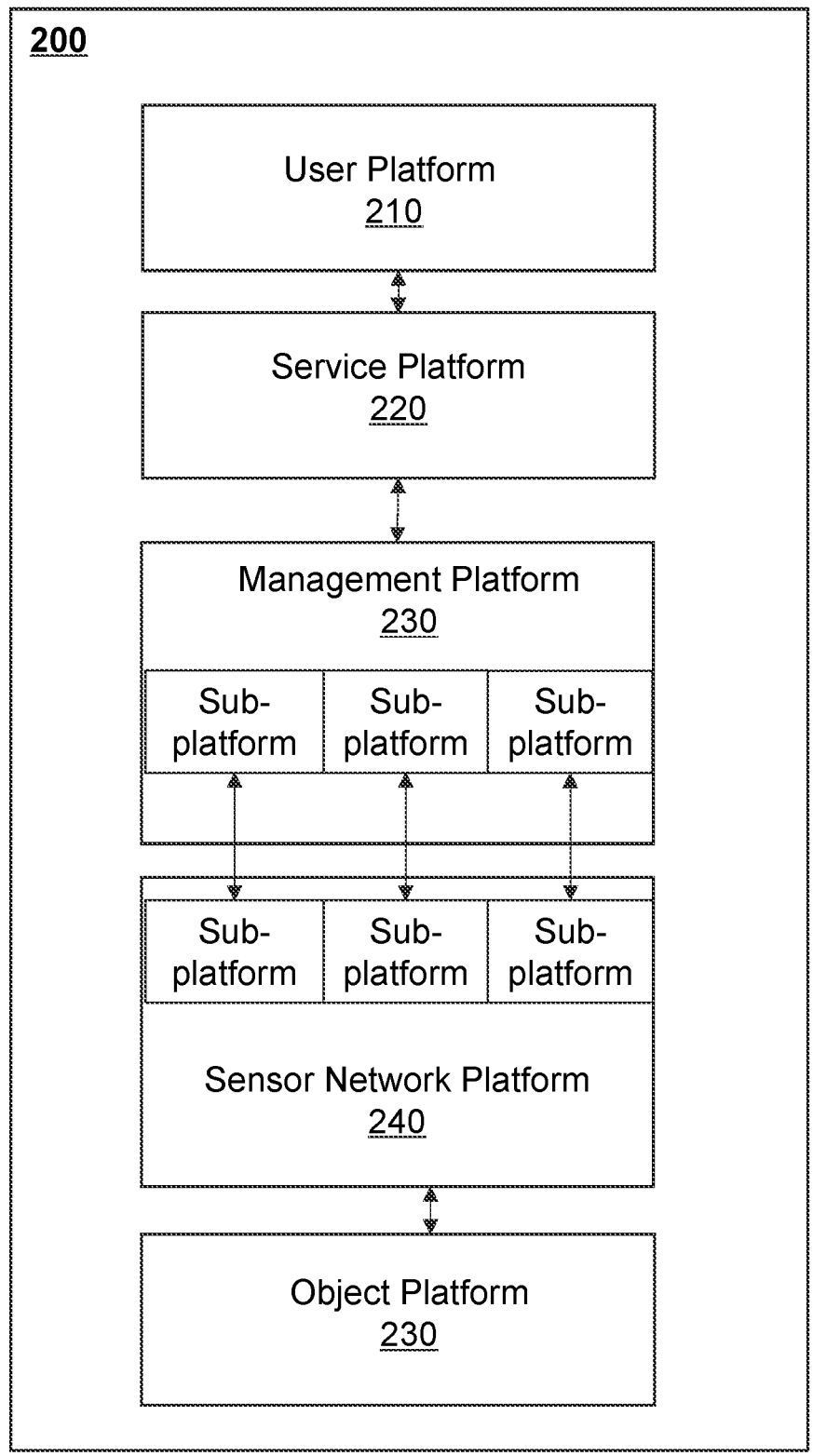
FIG. 2 is an exemplary structural diagram illustrating a system for fire monitoring and early warning in a smart city based on Internet of Things according to some embodiments of the present disclosure.

FIG. 2 is an exemplary structural diagram illustrating a system for fire monitoring and early warning in a smart city based on Internet of Things according to some embodiments of the present disclosure.

As shown in FIG. 2, the system 200 for fire monitoring and early warning in the smart city based on the Internet of Things includes a user platform 210, a service platform 220, a management platform 230, a sensor network platform 240, and an object platform 250. In some embodiments, the system 200 for fire monitoring and warning in the smart city based on the Internet of Things may be a part of the server 110 or implemented by the server 110.

In some embodiments, the system 200 for fire monitoring and early warning in the smart city based on the Internet of Things may obtain monitoring data. In some embodiments, the system 200 for fire monitoring and warning in the smart city based on the Internet of Things may determine a fire risk level based on monitoring data.

Various scenarios of fire monitoring and early warning may include fire risk level prediction scenarios, firefighting device detection scenarios, and fire escape success rate prediction scenarios. It should be noted that the above scenarios are only examples, and do not limit the specific application scenarios of the system 200 for fire monitoring and early warning in the smart city based on the Internet of Things. Those skilled in the art can apply the system 200 for fire monitoring and early warning in the smart city based on the Internet of Things to any other suitable scenarios on the basis of the content disclosed in this embodiment.

In some embodiments, the system 200 for fire monitoring and early warning in the smart city based on the Internet of Things may be applied to a fire risk level prediction. When applied to the fire risk level prediction, the object platform may collect monitoring data, and the management platform may determine the fire risk level based on the above information, and then determine different operations.

In some embodiments, the system 200 for fire monitoring and early warning in the smart city based on the Internet of Things may be applied to the detection of fire-fighting device. For example, based on the monitoring data, it is determined whether the function of the fire-fighting device is normal, whether the fire-fighting device is within the warranty period, etc.

In some embodiments, the system 200 for fire monitoring and early warning in the smart city based on the Internet of Things may be applied to prediction of a fire escape success rate. For example, the management platform may receive the monitoring data uploaded by the object platform based on the sensor network sub-platform, and determine the fire escape success rate.

The following will take the application of the system 200 for fire monitoring and early warning in the smart city based on the Internet of Things to a fire risk level prediction scenario as an example to specifically describe the system 200 for fire monitoring and early warning in the smart city based on the Internet of Things.

The user platform 210 may be a user-oriented service interface. In some embodiments, the user platform 210 may receive information from a user and/or the service platform. For example, the user platform 210 may receive input from a user. As another example, the user platform 210 may receive information fed back to the user from the service platform, such as fire risk level, prediction or the like. In some embodiments, the user platform 210 may be configured to feed information back to the user. In some embodiments, the user platform 210 may send the information to the service platform.

The service platform 220 may be a platform for preliminary processing of information. In some embodiments, the service platform 220 may send the information to the management platform. For example, passing monitoring data to the management platform. In some embodiments, the service platform 220 may receive information (for example, fire risk level, alarm, manual inspection interval, etc.) sent by the management platform.

The management platform 230 may refer to an Internet of Things platform that coordinates the connection and cooperation between various functional platforms, and provides perception management and control management.

In some embodiments, the management platform 230 may generate fire risk levels, alarms, and manual inspection intervals, and send the fire risk levels, alarms, and manual inspection intervals to the service platform. In some embodiments, the management platform 230 may be configured as an independent structure. The independent structure refers to that the management platform uses different management sub-platforms (also known as management sub-platforms or sub management platforms) for data storage, data processing and/or data transmission for the data of different sensor network sub-platforms (also known as sensor network sub-platforms or sub sensor network platforms). The management sub-platform is set based on different areas (such as factories, residences, office areas, shopping malls, etc.), each management sub-platform has a corresponding sensor network sub-platform, and the data obtained by the object platform is uploaded to the corresponding sensor network sub-platform, and then uploaded to the corresponding management sub-platform. In some embodiments, each management sub-platform may receive and process the monitoring data uploaded by the corresponding sensor network sub-platform, and issue an instruction to obtain the monitoring data of each area to the sensor network sub-platform. For example, each management sub-platform may correspond to the sensor network sub-platform of each sensor network platform one-to-one, and each management sub-platform may obtain the monitoring data of each area sent by each sensor network sub-platform.

In some embodiments, the management platform 230 is further configured to input the monitoring data into a risk level prediction model to determine the fire risk level, and the risk level prediction model is a machine learning model.

In some embodiments, the management platform 230 is further configured to: in response to the fire risk level meeting a preset condition, perform traffic regulation on a road within a preset range of the fire incident place.

In some embodiments, the management platform 230 is further configured to: based on the fire risk level, take the preset manual inspection interval corresponding to the fire risk level as the manual inspection interval.

Figure 3:
FIG. 3 is an exemplary flowchart illustrating a method for fire monitoring and warning in a smart city based on the Internet of Things according to some embodiments of the present disclosure.
Figure 4:
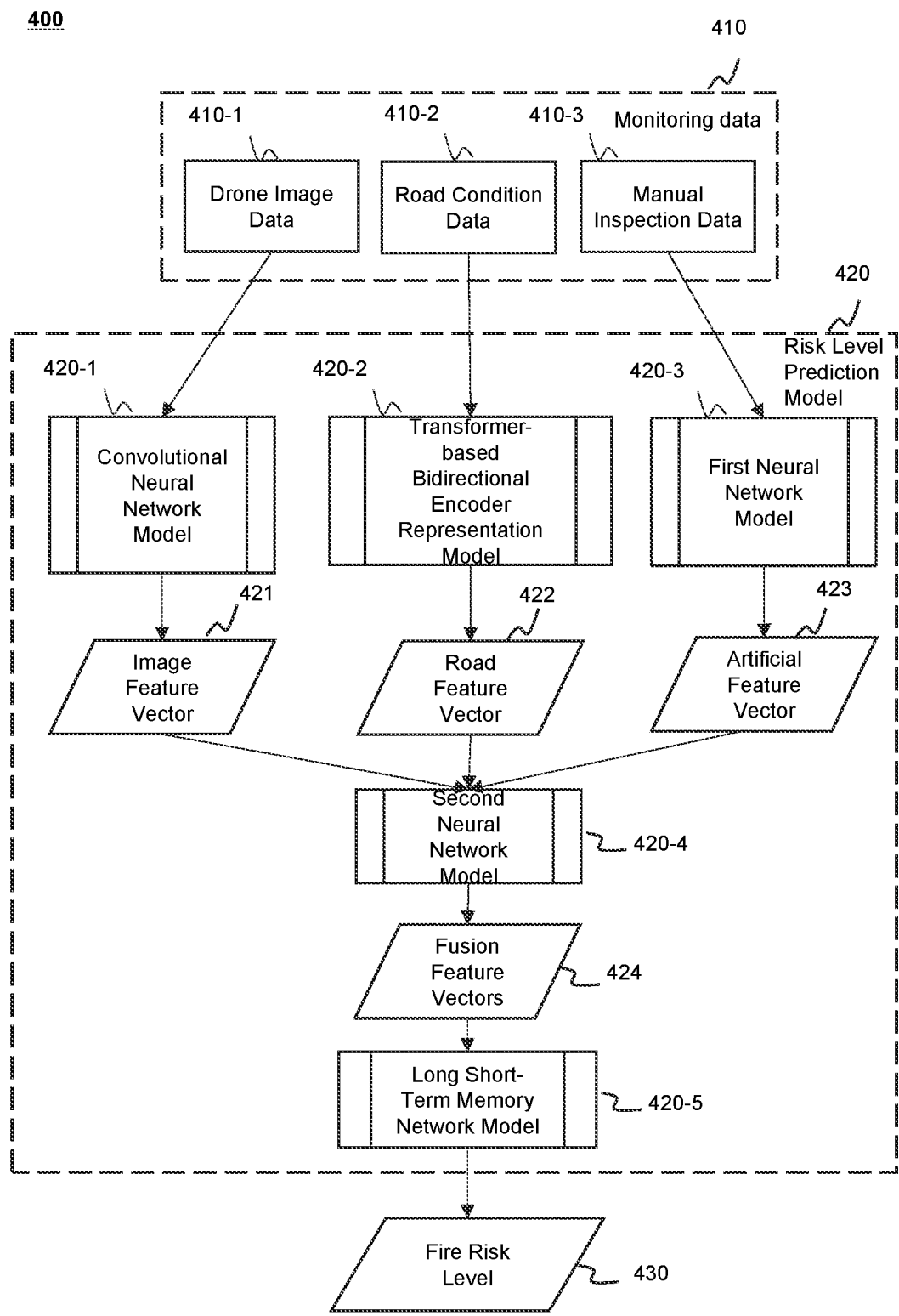
FIG. 4 is an exemplary schematic diagram illustrating a risk level prediction model according to some embodiments of the present disclosure.
Figure 5:
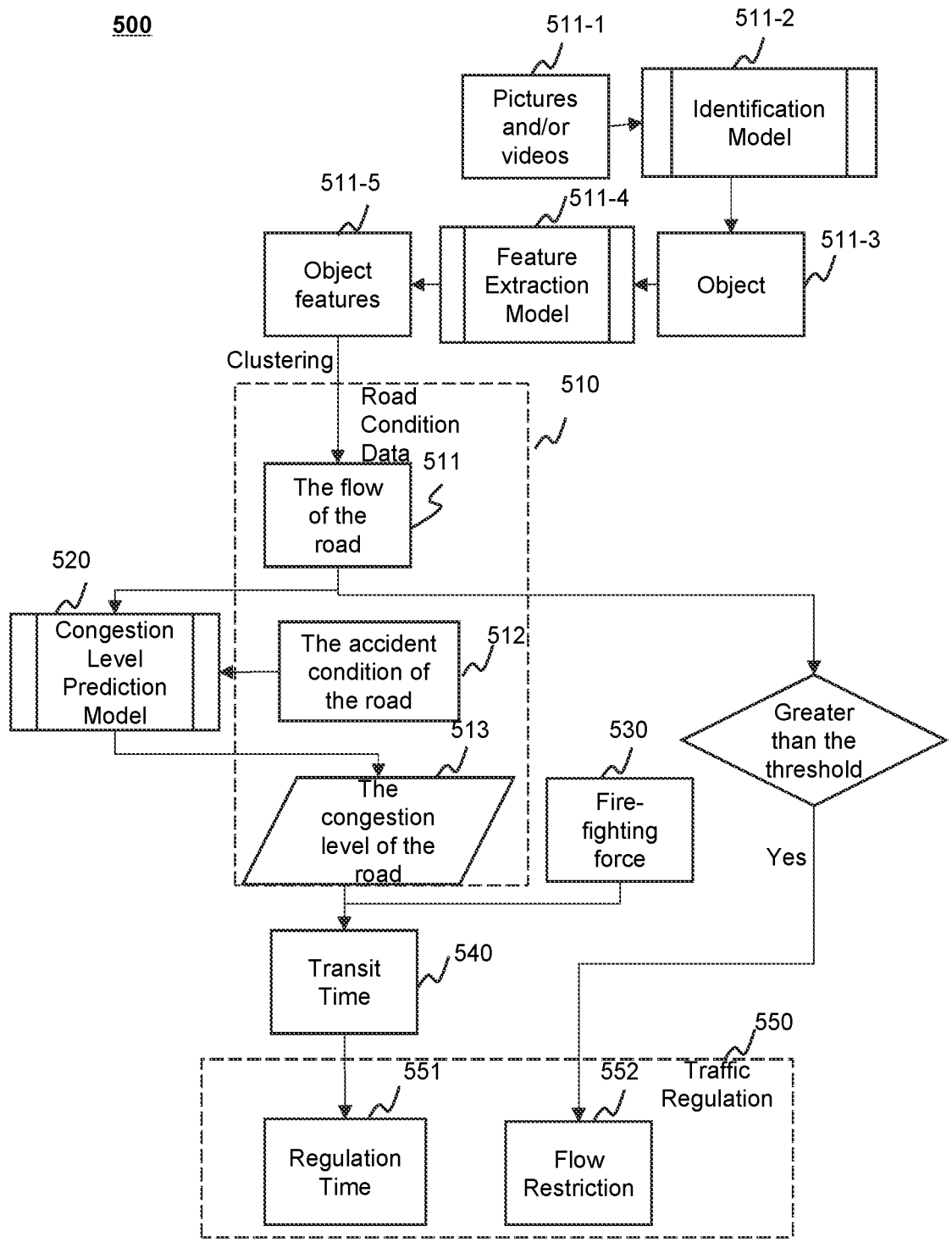
FIG. 5 is an exemplary schematic diagram illustrating traffic regulation according to some embodiments of the present disclosure.

For a specific description of the management platform 230, please refer to FIGS. 3-5 and its related descriptions.

The sensor network platform 240 may be a platform that realizes the interaction between the management platform and the object platform. In some embodiments, the sensor network platform 240 may receive an instruction sent by the management platform to obtain monitoring data of each area. In some embodiments, the sensor network platform 240 may send an instruction to obtain monitoring data of each area to the object platform. In some embodiments, the sensor network platform 240 may be configured as an independent structure. The independent structure means that the sensor network platform uses different sensor network sub-platforms (also called sensor network sub-platforms or sensor network sub-platforms) for data storage, data processing and/or data transmission for the data of different management sub-platforms. For example, each sensor network sub-platform may correspond one-to-one to the management sub-platforms of each management platform, and each sensor network sub-platform may obtain an instruction sent by each management sub-platform to obtain monitoring data of each area.

The object platform 250 may be a functional platform for the generation of perception information and the final execution of control information. The object platform 250 may obtain monitoring data based on the monitoring device. For example, smoke data may be obtained based on a smoke sensor. As another example, temperature data may be obtained based on a temperature sensor. As another example, drone image data may be obtained based on a drone. In some embodiments, the object platform 250 may send the obtained monitoring data to the sensor network platform 240 based on the instruction sent by the sensor network platform 240 to obtain monitoring data of each area.

For those skilled in the art, after understanding the principle of the system, it is possible to move the system 200 for fire monitoring and early warning in the smart city based on the Internet of Things to any other suitable scenario without departing from the principle.

It should be noted that the above description of the system and its parts are only for the convenience of description, and does not limit the description to the scope of the illustrated embodiments. It may be understood that for those skilled in the art, after understanding the principle of the system, it is possible to arbitrarily combine the various parts, or form a subsystem to connect with other parts without departing from the principle. For example, each component may share a storage device, and each component may also have its own storage device. Those variations and modifications may be within the scope of the protection of one or more embodiments of the disclosure.

FIG. 3 is an exemplary flowchart illustrating a method for fire monitoring and warning in a smart city based on the Internet of Things according to some embodiments of the present disclosure. In some embodiments, the process 300 may be performed by the management platform 230. As shown in FIG. 3, the process 300 may include the following steps:

Step 310, the management platform obtains the monitoring data collected by the object platforms through the sensor network platform, the monitoring data including smoke data, temperature data, image data of a drone, and manual inspection data, the manual inspection data being obtained based on a manual inspection interval.

The monitoring data may refer to data generated in the course of monitoring a fire. For example, the data of manual feedback, the data generated during the working process of the device, etc. In some embodiments, the monitoring data includes smoke data, temperature data, drone image data, and manual inspection data.

The smoke data may refer to data related to toxic and/or flammable gases. For example, the concentration of carbon monoxide, gas concentration, etc.

The drone image data may refer to the image data captured by the drone. For example, the video, pictures, etc. obtained by a drone shooting the fire incident place.

The manual inspection data may refer to the data obtained when the user and the fire department conduct inspections of the fire incident place, for example, objective data such as the number of historical fires, existing safety hazards, and whether fire-fighting facilities are complete; as another example, subjective data such as the proficiency of the masses in the use of fire extinguishers, the fire awareness of the masses, and the speed of the firefighters. For more information about the manual inspection data, please refer to FIG. 4 and its related descriptions. In some embodiments, based on the manual inspection interval, the manual inspection data may be obtained by the user terminal of the management platform based on the object platform.

The manual inspection interval may refer to the time interval between two adjacent inspections of the fire incident place performed by the user and/or the fire department.

In some embodiments, the management sub-platform may obtain the monitoring data collected by the object platform through the sensor network sub-platform. For example, in an area, the object platform in the area may obtain the temperature data of the area collected by the temperature sensor, the smoke data of the area collected by the smoke sensor, the drone image data of the area collected by the drone, and the manual inspection data of the area collected by the user terminal, the object platform may upload the acquired data to the sensor network sub-platform, and the sensor network sub-platform uploads the above-mentioned data of the area to the management sub-platform corresponding to the area.

Step 320, determining a fire risk level based on the monitoring data.

The fire risk level may refer to the probability of fire occurrence and/or the fire severity. The fire risk level may be represented in words and/or figures. For example, the probability of fire occurrence is 70%, a first-level fire, wherein the larger the value is, the greater the probability of fire occurrence and the more serious the fire are.

In some embodiments, the management platform may determine the fire risk level through preset rules based on the monitoring data.

In some embodiments, the management platform may determine the fire risk level based on the risk level prediction model. For more information about determining the fire risk level, please refer to FIG. 4 and its related instructions.

Step 330, in response to the fire risk level meeting the preset conditions, sending an alarm to the user platform through the service platform.

The preset conditions may refer to conditions preset for different fire risk levels. For example, the preset conditions may include a threshold when a fire occurs, e.g., if the fire risk level exceeds the threshold, a fire will occur. The threshold in the event of a fire may be set based on experience.

In some embodiments, the management platform may issue an alarm to the user platform through the service platform in response to the fire risk level meeting the preset conditions. The methods of issuing the alarm include but are not limited to voice, text, etc. The content of the alarm includes but is not limited to the early warning of the fire, the location of the fire, the size of the fire, etc.

In some embodiments, the management platform may further manage the fire incident place in response to the fire risk level meeting the preset conditions. For example, dispatch firefighters around the fire place to put out the fire in time. As another example, control the activation of firefighting facilities (such as automatic sprinkler systems, cooling sprinkler water supply systems, etc.) in the fire incident place. As another example, traffic regulation is carried out on the fire incident place.

For more information about traffic regulation, please refer to FIG. 5 and its related instructions.

Step 340, in response to the fire risk level not meeting the preset conditions, determining the manual inspection interval based on the fire risk level, and sending the manual inspection interval to the service platform and/or the user platform.

In some embodiments, the management platform may determine the manual inspection interval based on the fire risk level in response to the fire risk level not meeting the preset conditions, and the manual inspection interval is sent to the service platform and/or the user platform. For example, the management platform may determine that the risk of a fire is high based on a high fire risk level, and then determine that the manual inspection interval is short, such as half a day, 10 hours, or the like. As another example, the management platform may determine that the risk of a fire is small based on a low fire risk level, and then determine that a manual inspection interval is long, such as one week, 10 days, or the like.

Step 350: based on the fire risk level, taking the preset manual inspection interval corresponding to the fire risk level as the manual inspection interval.

The preset manual inspection interval may refer to a manual inspection interval that is set in advance.

In some embodiments, the fire risk level may be set with a corresponding preset manual inspection interval. For example, the probability of fire occurrence is 10%, and the corresponding preset manual inspection interval is set to once every ten days; the probability of fire occurrence is 60%, and the corresponding preset manual inspection interval is set to once every three days.

In some embodiments, based on the fire risk level, the management platform may use the preset manual inspection interval corresponding to the fire risk level as the manual inspection interval. For example, still taking the above embodiment as an example, the management platform may take once every three days as the time interval of manual inspection based on the fire risk level that the probability of fire occurrence is 60%.

By setting the corresponding time intervals of manual inspection for different fire risk levels, it is helpful to quickly determine the time intervals of manual inspection and improve the rationality and efficiency of manual inspection arrangements.

Some embodiments of this present disclosure can, combined with the Internet of Things, improve the accuracy of fire monitoring and early warning based on a variety of monitoring data. At the same time, taking different measures for different fire risk levels can avoid loss of life and property.

It should be noted that the description of the relevant process 300 is merely for example and description, without limiting the scope of the present disclosure. Process 300 may be made various modifications and changes by those skilled in the art under the guidance of the present disclosure. However, these modifications and changes are still within the scope of the present disclosure. For example, the process 300 may also include preprocessing steps.

In some embodiments, the management platform may input the monitoring data into a risk level prediction model to determine the fire risk level, and the risk level prediction model is a machine learning model.

In some embodiments, the risk level prediction model may include a Convolutional Neural Networks (CNN) model and a Long Short-Term Memory (LSTM) model.

An input of the convolutional neural network model may be the drone image data, and an output may be an image feature vector. An input of the long short-term memory network model may be the image feature vector, smoke data and temperature data, and an output may be a fire risk level.

The risk level prediction model may be obtained based on training. The training of the risk level prediction model may be performed by the management platform. When training the risk level prediction model, multiple labeled training samples may be used to train through various methods (for example, gradient descent), so that the parameters of the model may be learned. When the trained model meets the preset conditions, the training ends, and the trained risk level prediction model is obtained. The training samples may include historical monitoring data. The labels of the training samples may be fire risk levels corresponding to the historical monitoring data. The labels of the training samples may be obtained by manual annotation.

In order to more accurately determine the fire risk level, the monitoring data may also include more types of data. In some embodiments, the monitoring data may further include road condition data within a preset range of the fire incident place.

The preset range may refer to the range of a road that fire-fighting forces may pass around the fire incident place. The preset range may be adjusted dynamically. For example, the adjustment is made based on fire information. For more information about fire information, please refer to FIG. 5 and its related descriptions. For example, the fire at location A is small and only a small number of firefighters are needed, and the preset range may be the road that the fire brigade at location A can pass through; the fire at location B is large and requires a large number of firefighters, and the preset range is the road that the fire brigade at location B and location C may pass through. As another example, the adjustment is made based on the estimated travel time of the fire brigade. For example, the fire brigade is expected to pass the road A at time t1, the road A is regulated, the fire brigade is expected to pass the road B at time t2, the road B is regulated, and the regulation of the road A is canceled.

The road condition data may refer to data related to a road within the preset range. The road condition data may include: the positional relationship between the road and the fire accident place, the congestion level of the road, the width of the road, speed limit information, regulation information, location information, or the like.

The road condition data may be obtained by the traffic monitoring device of the management platform based on the object platform. For example, the traffic monitoring device may take pictures and/or videos of the road, and the management platform may obtain road condition data in various feasible ways based on the pictures and/or videos taken by the traffic monitoring device. The congestion level of the road may be obtained through the description of FIG. 5. For more information about the congestion level of the road, please refer to FIG. 5 and its related descriptions.

In some embodiments, the monitoring data may also include manual inspection data. The manual inspection data may also include evaluation results determined based on the manual inspection data. The evaluation results may refer to the results obtained by evaluating the performance of people and/or objects in terms of fire-fighting. The evaluation results may be represented in words. For example, excellent, good, etc. The evaluation results may also be represented by numbers. For example, 50, 80, etc., wherein the larger the value is, the better the evaluation results are. The better the evaluation results are, the better the performance of people and/or objects in fire-fighting are, such as high fire awareness of people and reliable quality of fire-fighting facilities.

Since the monitoring data includes more types of data, in order to ensure the accuracy of the output result of the risk level prediction model, the risk level prediction model may be set to include other models. For example, any one or combination of a deep neural network model, a recurrent neural network model, or other custom model structures, etc. In some embodiments, the risk level prediction model may include a convolutional neural network model, a Bidirectional Encoder Representations from Transformers (BERT) model, a Neural Network (NN) model, a long short-term memory network model.

An input of the convolutional neural network model may be the drone image data, and an output may be the image feature vector; an input of the BERT model may be the road condition data, and an output may be the road feature vector; an input of the first neural network model may be manual inspection data, and an output may be the artificial feature vector; an input of the second neural network model is the image feature vector, the road feature vector and the artificial feature vector, and an output is the fusion feature vector; an input of the long short-term memory network of the risk level prediction model is the fusion feature vector, and an output is the fire risk level.

In some embodiments, the management platform may determine the fire risk level through a risk level prediction model based on the above data. For a clearer description, the risk level prediction model will be described below with reference to FIG. 4.

FIG. 4 is an exemplary schematic diagram illustrating the risk level prediction model according to some embodiments of the present disclosure.

As shown in FIG. 4, the monitoring data 410 may include the drone image data 410-1, the road condition data 410-2, and the manual inspection data 410-3; the risk level prediction model 420 may include a convolutional neural network model 420-1, a BERT model 420-2, a first neural network model 420-3, a second neural network model 420-4, a long short-term memory network model 420-5.

The management platform may input the monitoring data 410 into the risk level prediction model 420, and output the fire risk level 430. An input of the convolutional neural network model 420-1 is the image data of the drone 410-1, and an output is an image feature vector 421; an input of the BERT model 420-2 is the road condition data 410-2, and an output is a road feature vector 422; an input of the first neural network model 420-3 is the manual inspection data 410-3, and an output is an artificial feature vector 423. The second neural network model 420-4 may take the image feature vector 421, the road feature vector 422, and the artificial feature vector 423 as input, and the obtained output is a fusion feature vector 424; an input of the long short-term memory network model is the fusion feature vector 424, so as to obtain the fire risk level 430.

From the above description and as shown in FIG. 4, the risk level prediction model may include a convolutional neural network model, a BERT model, a first neural network model, a second neural network model, and a long short-term memory network model. The output of the convolutional neural network model, the BERT model, and the first neural network model may be the input of the second neural network model, and the output of the second neural network model may be the input of the long short-term memory network model.

In some embodiments, the convolutional neural network model, the BERT model, and the first neural network model may be obtained through joint training with the second neural network model and the long short-term memory network model. The management platform can train an initial convolutional neural network model, an initial BERT model, an initial first neural network model, and an initial second neural network model and the initial long short-term memory network model based on a large number of labeled training samples. Specifically, the labeled training samples are input into the initial convolutional neural network model, the initial BERT model, and the initial first neural network model; the parameters of the initial convolutional neural network model, the parameters of the initial BERT model, the parameters of the initial first neural network model, and the parameters of the initial second neural network model and the parameters of the initial long short-term memory network model are updated by training until the parameters of the trained intermediate convolutional neural network model, the parameters of the intermediate BERT model, the parameters of the intermediate first neural network model and the parameters of the intermediate second neural network model, and the parameters of the intermediate long short-term memory network model meet the preset conditions to obtain the trained convolutional neural network model, the BERT model, the first neural network model and the second neural network model, and the long short-term memory network model, wherein the preset conditions may be that the loss function is smaller than the preset threshold, converges, or the training cycle reaches the preset threshold.

In the above training process, the training samples may include historical monitoring data. The labels of the training samples may be fire risk levels corresponding to historical monitoring data. The labels of the training samples may be obtained by manual annotation.

Through the above training methods, in some cases, it is beneficial to solve the problem of difficulty in obtaining labels when training the second neural network model alone and training the long short-term memory network model alone.

Some embodiments of the present disclosure can improve the accuracy of fire monitoring and early warning by using the risk level prediction model. In addition, based on various types of monitoring data including road condition data, manual inspection data, etc., by using the risk level prediction model including various models, the output result of the model, that is, the fire risk level, can be more accurate and reliable.

FIG. 5 is an exemplary schematic diagram illustrating traffic regulation according to some embodiments of the present disclosure.

In some embodiments, in response to the fire risk level meeting the preset conditions, the management platform may perform traffic regulation on a road within a preset range of the fire incident place.

The traffic regulation may refer to measures to regulate the passage of vehicles and/or people on a road. As shown in FIG. 5, the traffic regulation 550 may include the regulation time 551 and the flow restriction 552.

The road condition data may also include traffic of the road and accident condition of the road. As shown in FIG. 5, the road condition data 510 may include the traffic flow 511 of the road and the accident condition 512 of the road. In some embodiments, the road condition data 510 may also include a congestion level 513 of the road determined based on the traffic flow 511 of the road and the accident condition 512 of the road.

The accident condition of the road may refer to whether the accident occurred on the road, and the accident that has been occurred. For example, the accident condition of the road may include no accident, an accident involving a rear-end collision of five cars, or the like. The accident condition of the road may be obtained by the traffic monitoring device of the management platform based on the object platform. For example, the traffic monitoring device may take pictures and/or videos of the road, and the management platform may obtain the accident condition of the road in various feasible ways based on the taken pictures and/or videos.

In some embodiments, the management platform may determine the traffic flow of the road by an identification model based on the captured pictures and/or videos.

The identification model may refer to the trained machine learning model. In some embodiments, the identification model may be a YOLO (You Only Look Once, YOLO) model. In some embodiments, the identification model may process the input pictures and/or videos, and output a plurality of identification frames. Each identification frame may be regarded as a vehicle and/or person, and each identification frame may also be referred to as each object. As shown in FIG. 5, the identification model 511-2 may process the input picture and/or video 511-1, and output the object 511-3. The management platform may perform statistics on the objects to determine the traffic flow of the road.

In some embodiments, when training the identification model, a plurality of labeled training samples may be used, and the training is performed by various methods (e.g., gradient descent method), so that the parameters of the model may be learned. When the trained model meets the preset conditions, the training ends, and the trained identification model is obtained.

The training samples may include historical pictures and/or videos taken. The labels of the training samples may be historical objects. The labels of the training samples may be obtained by manual annotation.

It can be understood that vehicles and pedestrians on the road are usually moving, and the same vehicle and/or person may appear in pictures and/or videos captured at different times.

In some embodiments, the management platform may input the object obtained by the identification model into the feature extraction model to obtain the feature of the object. As shown in FIG. 5, the management platform may input the object 511-3 to the feature extraction model 511-4 to obtain the feature 511-5 of the object.

The feature extraction model may refer to the trained machine learning model. In some embodiments, the feature extraction model may be a convolutional neural network model. When training the feature extraction model, it can refer to the training method of the identification model. The training samples may include historical objects obtained through the identification model. The labels of the training samples may be historical object features. The labels of the training samples may be obtained by manual annotation.

In some embodiments, the management platform may cluster the features of the objects to determine the traffic flow of the road. As shown in FIG. 5, the management platform may cluster the feature 511-5 of the object to determine the traffic flow 511 of the road. For example, in a road video, an object in the 10th frame image and an object in the 20th frame image belong to a cluster center after clustering, indicating that the two objects are the same person or the same vehicle, when the management platform counts the objects of the 10th frame image and the 20th frame image, the object may be counted only once. By using clustering, it is possible to prevent the same object from being double-counted when determining the flow, thereby improving the accuracy of the determined flow.

In some embodiments, the management platform may input the traffic flow of the road and the accident condition of the road into a congestion level prediction model to determine the congestion level of the road. As shown in FIG. 5, the management platform may input the traffic flow 511 of the road and the accident condition 512 of the road into the congestion level prediction model 520 to determine the congestion level 513 of the road.

The congestion level prediction model may refer to a trained machine learning model. In some embodiments, the congestion level prediction model may be a deep neural network model. When training the congestion level prediction model, please refer to the training method of the identification model. The training samples may include historical road traffic and historical road accidents. The labels of the training samples may be historical road congestion levels. The labels of the training samples may be obtained by manual annotation.

In some embodiments, the management platform may determine traffic regulation based on the congestion level of the road. In some embodiments, the management platform may determine the transit time based on the congestion level of the road and the firefighting force. As shown in FIG. 5, the management platform may determine the transit time 540 based on the congestion level 513 of the road and the fire-fighting force 530.

The firefighting force may indicate the number and type of personnel, devices, vehicles, etc. For example, 10 personnel with 5 years of work experience, 1 water tank fire truck, 3 foam fire trucks, etc.

The transit time may refer to the time it takes for a fire-fighting force to pass the road. For example, the time required for 3 fire trucks to pass through road A in sequence.

In some embodiments, the management platform may determine the firefighting force based on fire information. The fire information may refer to information related to the occurred fire, such as the area of fire, the size of the fire, or the like. For example, the management platform may determine the firefighting force to be personnel with more work experience and more fire trucks based on the area of the fire being larger than a preset threshold. The fire information may be obtained by the management platform based on monitoring data. For example, the management platform obtains the area of fire and the size of the fire based on the drone image data.

In some embodiments, the management platform may determine the time greater than or equal to the transit time as the regulation time based on the transit time. As shown in FIG. 5, based on the transit time 540 (e.g., 180 seconds), the management platform may determine the time greater than or equal to the transit time (e.g., 200 seconds) as the regulation time 551.

In some embodiments, the management platform may restrict traffic when the traffic on the road is greater than a threshold. As shown in FIG. 5, the management platform may perform the flow restriction 552 based on the fact that the flow of the road is greater than a threshold. The flow restriction may refer to restricting the flow of vehicles and/or people on the road, and the management platform may restrict the flow by sending instructions such as temporarily prohibiting entry, detouring to other roads, etc.

Some embodiments of this present disclosure perform traffic regulation on roads within a preset range of the fire incident place, which can provide a smoother road and facilitate the arrival of firefighters and the evacuation of people, further reduce the personal injury and property loss of people at the fire accident place.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for fire monitoring and early warning in a smart city based on Internet of Things, which is realized by a system for fire monitoring and early warning in a smart city based on Internet of Things, the system comprising a user platform, a service platform, a management platform, a sensor network platform and object platforms, the method being executed by the management platform, and the method comprising:
    obtaining monitoring data collected by the object platforms through the sensor network platform, the monitoring data including smoke data, temperature data, image data of a drone, and manual inspection data, the manual inspection data being obtained based on a manual inspection interval; the sensor network platform adopting different sensor network sub-platforms for performing data storage, data processing and/or data transmission on the monitoring data obtained by the different object platforms; the different sensor network sub-platforms corresponding to different regional locations; the management platform adopting different management sub-platforms for performing data storage, data processing and/or data transmission on the monitoring data obtained by the different sensor network sub-platforms;
    determining a fire risk level based on the monitoring data; wherein determining the fire risk level based on the monitoring data includes:
        determining the fire risk level by inputting the monitoring data into a risk level prediction model, wherein the risk level prediction model is a machine learning model; wherein the risk level prediction model include a convolutional neural network model and a long short-term memory model;
    an input of the convolutional neural network model is the image data of the drone, and an output of the convolutional neural network model is an image feature vector; an input of the long short-term memory network model is the image feature vector, the smoke data, and the temperature data, and an output of the long short-term memory network model is the fire risk level;
    in response to the fire risk level meeting a preset condition, sending an alarm to the user platform through the service platform; and
    in response to the fire risk level not meeting the preset condition, determining the manual inspection interval based on the fire risk level, and sending the manual inspection interval to the service platform and/or the user platform.

2. The method of claim 1, wherein the monitoring data further comprises road condition data within a preset range of a fire incident place; the road condition data including one or more of a positional relationship between a road and a fire incident place, a congestion degree of the road, a width of the road, speed limit information, regulation information, and location information.

3. The method of claim 1, wherein the manual inspection data includes user self-inspection data and fire department inspection data, the manual inspection data further including an evaluation result determined based on the manual inspection.

4. The method of claim 1, further comprising:
    in response to the fire risk level meeting the preset condition, performing traffic regulation on a road within a preset range of a fire incident place.

5. The method of claim 4, wherein traffic regulation is determined by the following operation including:
    determining a congestion level of the road; and
    based on the congestion level, determining the traffic regulation.

6. The method of claim 1, wherein the fire risk level is set with a corresponding preset manual inspection interval, and the determining the manual inspection interval based on the fire risk level includes:
    based on the fire risk level, taking the preset manual inspection interval corresponding to the fire risk level as the manual inspection interval.

7. A system for fire monitoring and early warning in a smart city based on Internet of Things, wherein the system comprises a user platform, a service platform, a management platform, a sensor network platform and object platforms, the management platform is configured to:
    obtain monitoring data collected by the object platforms through the sensor network platform, the monitoring data including smoke data, temperature data, image data of a drone, and manual inspection data, the manual inspection data being obtained based on a manual inspection interval; the sensor network platform adopting different sensor network sub-platforms for performing data storage, data processing and/or data transmission on the monitoring data obtained by the different object platforms; the different sensor network sub-platforms corresponding to different regional locations; the management platform adopting different management sub-platforms for performing data storage, data processing and/or data transmission on the monitoring data obtained by the different sensor network sub-platforms;
    determine a fire risk level based on the monitoring data; wherein to determine the fire risk level based on the monitoring data, the management platform is further configured to:
        determine the fire risk level by inputting the monitoring data into a risk level prediction model, wherein the risk level prediction model is a machine learning model; wherein the risk level prediction model include a convolutional neural network model and a long short-term memory model; an input of the convolutional neural network model is the image data of the drone, and an output of the convolutional neural network model is an image feature vector; an input of the long short-term memory network model is the image feature vector, the smoke data, and the temperature data, and an output of the long short-term memory network model is the fire risk level;

in response to the fire risk level meeting a preset condition, send an alarm to the user platform through the service platform; and in response to the fire risk level not meeting the preset condition, determine the manual inspection interval based on the fire risk level, and send the manual inspection interval to the service platform and/or the user platform.

8. The system of claim 7, wherein the monitoring data further comprises road condition data within a preset range of a fire incident place; the road condition data including one or more of a positional relationship between a road and a fire incident place, a congestion degree of the road, a width of the road, speed limit information, regulation information, and location information.

9. The system of claim 7, wherein the manual inspection data includes user self-inspection data and fire department inspection data, the manual inspection data further including an evaluation result determined based on the manual inspection.

10. The system of claim 7, wherein the management platform is further configured to in response to the fire risk level meeting the preset condition, perform traffic regulation on a road within a preset range of a fire incident place.

11. The system of claim 10, wherein the management platform is further configured to determine a congestion level of the road; and based on the congestion level, determine the traffic regulation.

12. The system of claim 7, wherein the fire risk level is set with a corresponding preset manual inspection interval, and the determining the manual inspection interval based on the fire risk level includes:

based on the fire risk level, taking the preset manual inspection interval corresponding to the fire risk level as the manual inspection interval.

13. A non-transitory computer-readable storage medium, wherein the storage medium stores computer instructions, after the computer reads the computer instructions in the storage medium, the computer implements a method for fire monitoring and early warning in a smart city based on Internet of Things, the method comprising:

obtaining monitoring data collected by the object platforms through the sensor network platform, the monitoring data including smoke data, temperature data, image data of a drone, and manual inspection data, the manual inspection data being obtained based on a manual inspection interval; the sensor network platform adopting different sensor network sub-platforms for performing data storage, data processing and/or data transmission on the monitoring data obtained by the different object platforms; the different sensor network sub-platforms corresponding to different regional locations; the management platform adopting different management sub-platforms for performing data storage, data processing and/or data transmission on the monitoring data obtained by the different sensor network sub-platforms;

determining a fire risk level based on the monitoring data; wherein determining the fire risk level based on the monitoring data includes:

determining the fire risk level by inputting the monitoring data into a risk level prediction model, wherein the risk level prediction model is a machine learning model; wherein the risk level prediction model include a convolutional neural network model and a long short-term memory model;

an input of the convolutional neural network model is the image data of the drone, and an output of the convolutional neural network model is an image feature vector; an input of the long short-term memory network model is the image feature vector, the smoke data, and the temperature data, and an output of the long short-term memory network model is the fire risk level;

in response to the fire risk level meeting a preset condition, sending an alarm to the user platform through the service platform; and in response to the fire risk level not meeting the preset condition, determining the manual inspection interval based on the fire risk level, and sending the manual inspection interval to the service platform and/or the user platform.

* * * * *